(12) United States Patent
Li et al.

(10) Patent No.: US 6,641,935 B1
(45) Date of Patent: Nov. 4, 2003

(54) PERPENDICULAR RECORDING MEDIA WITH SOFT MAGNETIC SUPERLATTICE UNDERLAYER

(75) Inventors: Shaoping Li, Naperville, IL (US); Ga-lane Chen, Fremont, CA (US); Charles Potter, Bloomington, MN (US); Dean Palmer, Minneapolis, MN (US); Philip Steiner, Los Altos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/956,052

(22) Filed: Sep. 20, 2001

Related U.S. Application Data

(60) Provisional application No. 60/252,201, filed on Nov. 20, 2000.

(51) Int. Cl.[7] .............................. G11B 5/66; G11B 5/70; H01J 1/00
(52) U.S. Cl. .................... 428/694 TS; 428/694 TM; 428/336; 428/611; 428/900
(58) Field of Search .................. 428/694 TM, 900, 428/611, 336, 694 TS

(56) References Cited

U.S. PATENT DOCUMENTS

| 4,687,712 A | * | 8/1987 | Sugita et al. ............... 428/611 |
| 5,851,643 A | * | 12/1998 | Honda et al. ............... 428/212 |
| 6,420,058 B1 | * | 7/2002 | Haratani et al. ......... 428/694 T |
| 2002/0028357 A1 | * | 3/2002 | Shukh et al. ........ 428/694 TM |

* cited by examiner

Primary Examiner—Holly Rickman
(74) Attorney, Agent, or Firm—McDermott, Will & Emery

(57) ABSTRACT

A low noise, high areal recording density, perpendicular magnetic recording medium, comprises:

(a) a non-magnetic substrate having a surface with a layer stack formed thereon, the layer stack comprising, in overlying sequence from the substrate surface:

(b) a soft magnetic underlayer comprised of a soft magnetic multilayer superlattice structure; and (c) a perpendicularly anisotropic, hard magnetic recording layer.

Embodiments of the invention include providing the soft magnetic multilayer superlattice structure in the form of n stacked soft magnetic/non-magnetic layer pairs, where n is an integer between about 2 and about 9.

19 Claims, 4 Drawing Sheets

$\mu = dM/dH$

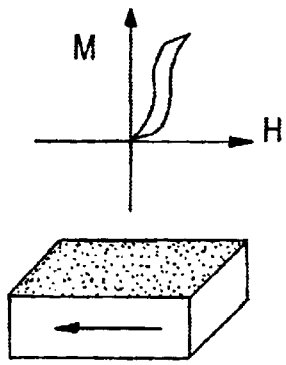
FIG. 4(A)
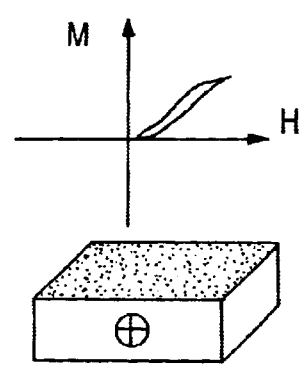
FIG. 4(B)
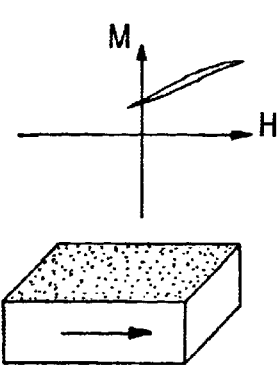
FIG. 4(C)
FIG. 5
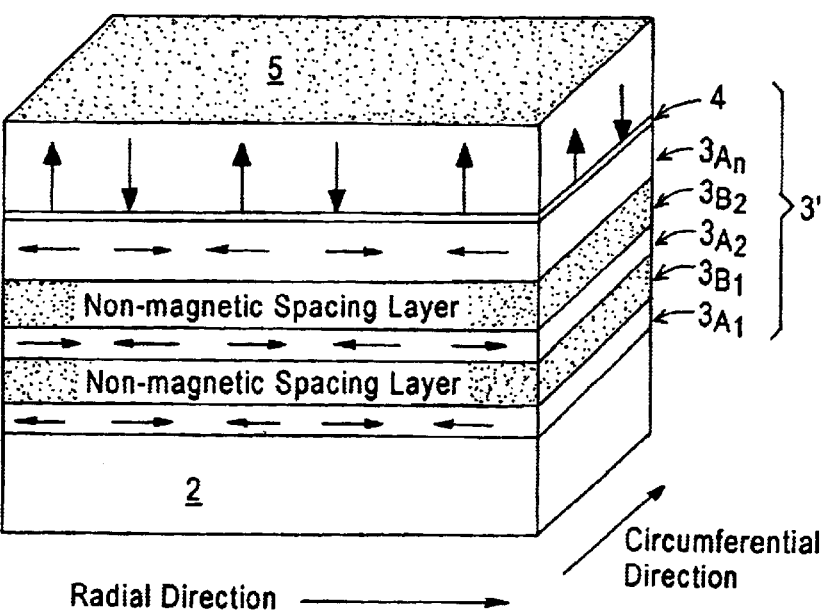

PERPENDICULAR RECORDING MEDIA WITH SOFT MAGNETIC SUPERLATTICE UNDERLAYER

CROSS-REFERENCE TO PROVISIONAL APPLICATION

This application claims priority from U.S. provisional patent application Ser. No. 60/252,201 filed Nov. 20, 2000, the entire disclosure of which is incorporated herein by reference.

FIELD OF THE INVENTION

The present invention relates to improved perpendicular magnetic recording media with improved signal-to-noise ratio ("SNR"), for use with single-pole transducer heads. The present invention is of particular utility in the manufacture of data/information storage and retrieval media, e.g., hard disks, exhibiting ultra-high areal recording densities in the range of about 100–500 $Gb/in^2$ and ultra-low noise characteristics.

BACKGROUND OF THE INVENTION

Magnetic media are widely used in various applications, particularly in the computer industry, and efforts are continually made with the aim of increasing the areal recording density, i.e., bit density of the magnetic media. In this regard, socalled "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that efficient, high bit density recording utilizing a perpendicular magnetic medium requires interposition of a relatively thick (i.e., as compared to the magnetic recording layer), magnetically "soft" underlayer, i.e., a magnetic layer having relatively low coercivity, such as of a NiFe alloy (Permalloy), between the non-magnetic substrate, e.g., of glass, aluminum (Al) or an Al-based alloy, and the "hard" magnetic recording layer, e.g., of a cobalt-based alloy (e.g., a Co—Cr alloy) having perpendicular anisotropy. The magnetically soft underlayer serves to guide magnetic flux emanating from the head through the hard, perpendicular magnetic recording layer. In addition, the magnetically soft underlayer reduces susceptibility of the medium to thermally-activated magnetization reversal by reducing the demagnetizing fields which lower the energy barrier that maintains the current state of magnetization.

A typical perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 3, 4, and 5, respectively, indicate the substrate, soft magnetic underlayer, at least one non-magnetic interlayer, and vertically oriented, hard magnetic recording layer of perpendicular magnetic medium 1, and reference numerals 7 and 8, respectively, indicate the single and auxiliary poles of single-pole magnetic transducer head 6. Relatively thin interlayer 4 (also referred to as an "intermediate" layer), comprised of one or more layers of non-magnetic materials, serves to (1) prevent magnetic interaction between the soft underlayer 3 and the hard recording layer 5 and (2) promote desired microstructural and magnetic properties of the hard recording layer. As shown by the arrows in the figure indicating the path of the magnetic flux φ, flux φ is seen as emanating from single pole 7 of single-pole magnetic transducer head 6, entering and passing through vertically oriented, hard magnetic recording layer 5 in the region above single pole 7, entering and travelling along soft magnetic underlayer 3 for a distance, and then exiting therefrom and passing through vertically oriented, hard magnetic recording layer 5 in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer, such as of a diamond-like carbon (DLC) formed over hard magnetic layer 5, and a lubricant topcoat layer, such as of a perfluoropolyethylene material, formed over the protective overcoat layer. Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials; underlayer 3 is typically comprised of an about 2,000 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, etc.; interlayer 4 typically comprises an up to about 100 Å thick layer of a non-magnetic material, such as TiCr; and hard magnetic layer 5 is typically comprised of an about 100 to about 250 Å thick layer of a Co-based alloy including one or more elements selected from the group consisting of Cr, Fe, Ta, Ni, Mo, Pt, V, Nb, Ge, and B, iron oxides, such as $Fe_3O_4$ and $\delta$-$Fe_2O_3$, or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick. Each type of hard magnetic recording layer material has perpendicular anisotropy arising from magneto-crystalline anisotropy ($1^{st}$ type) and/or interfacial anisotropy ($2_{nd}$ type).

A significant problem and drawback associated with the utilization of soft magnetic underlayers, such as layer 3 shown in FIG. 1, is the generation of noise resulting from, inter alia, pinning and unpinning (i.e., motion) of the magnetic domain walls thereof, termed "Barkhausen noise", which noise adversely affects performance characteristics of magnetic media, particularly high bit density magnetic media. However, soft magnetic underlayer 3 is, as should be apparent from FIG. 1, necessary for providing an effective path for magnetic flux closure during the writing process. As is known, in the absence of such soft magnetic underlayer, the longitudinal writing field gradient is much sharper than its perpendicular counterpart. By contrast, however, when such soft magnetic underlayer is present, the writing field gradient is sharpest in the perpendicular direction. Further, the sharpest possible writing field gradient is necessary for obtaining the highest possible signal-to-media noise ratio ("SNMR").

However, despite various advances and improvements in the fabrication technology of high areal recording density magnetic recording media including soft magnetic underlayers, the latter remain as a major source of noise in perpendicular media. More specifically, experimentation has established that the soft underlayer generates a significant amount of noise sufficient to exert a negative influence on the SNMR. It has been further determined that the problem of soft underlayer-generated noise resides in two distinct aspects, i.e., a first aspect associated with magnetic stray and fringe fields of the soft underlayer, and a second aspect associated with insufficient writing of the media due to non-uniform magnetization distributions in the soft underlayers.

As for the first aspect, it has been determined that inhomogeneous magnetization configurations, e.g., Bloch domains, various other types of domain walls, vortex structures, etc., as schematically shown in FIG. 2, produce sources of magnetic charge, resulting in quite strong magnetic fields which can disturb the recorded signal patterns.

As for the second aspect, it has also been observed that the abovementioned inhomogeneous magnetization configurations which occur in the soft magnetic underlayers can also result in inhomogeneous distributions of local magnetic permeability, which can, in turn, exert a strong negative influence on the writing process, whereby the written bit transition quality is significantly deteriorated. Typically, in bulk soft material, e.g., in NiFe (Permalloy), the grains are ferromagnetically coupled and the magnetic domains, easy axis of magnetization, and magnetization are spatially randomly distributed. As a consequence, the M-H hysteresis loop of the entire (i.e., bulk) material is the average of all of the magnetization re-orientation processes, as illustrated in FIG. 3.

In this instance, magnetization reversal, from saturation direction in one direction to saturation in the other direction, occurs almost entirely via domain wall movement. Thus, a large initial permeability (obtained from the slope of an initial magnetization curve obtained by placing a demagnetized sample in a zero H field, and then gradually increasing a magnetic field H applied thereto in the positive direction. The initial slope of the B vs. H curve is the initial permeability) can be readily obtained. However, the magnetic behavior of concern in the context of perpendicular recording media is the local permeability of the soft underlayer and the local magnetic hysteresis loop. The writing process in magnetic media is closely associated with the local magnetization re-orientation behavior of the soft underlayer, especially as the storage bit size is reduced and the areal recording density increased (it being recognized that the dimension of the storage bits is smaller than the domain size).

Now, assume for the moment that the vertical domains and Bloch walls, which move quite slowly, are eliminated from a soft magnetic underlayer, leaving only Neel walls, and that local magnetization reversal occurs in a fast, coherent rotation mode. In such an idealized case, the permeability of the soft magnetic underlayer will still be inhomogeneous because the local magnetization is inhomogeneously spatially distributed. In some local areas, the permeability may be quite high if the direction of the magnetic moment is opposite to the direction of the writing field. In such instance, an effective magnetic flux path can be readily established. However, in other local areas, the permeability may be very low, as when the local magnetization direction is already parallel to the writing field. In such case, the soft magnetic underlayer is at least partially locally saturated prior to application of the external magnetic field. As a consequence, the magnetic flux path cannot be well (i.e., fully) established and good bit writing transitions cannot be obtained in such regions. In actuality, the permeability of the soft magnetic underlayer is distributed non-uniformly and is entirely dependent upon the local magnetization configurations, as schematically illustrated in FIGS. 4(A)–4(C), wherein FIG. 4(A) illustrates the local magnetic hysteresis loop obtained when the local magnetization is opposite that of the applied writing field; FIG. 4(B) illustrates the local magnetic hysteresis loop obtained when the local magnetization is perpendicular to the applied writing field; and FIG. 4(C) illustrates the local magnetic hysteresis loop when the local magnetization is parallel to the applied writing field, leading to poor bit writing.

Another major problem associated with conventional soft magnetic underlayers is the irreversibility of the local magnetization process. As a consequence, the local magnetization distribution patterns depend upon the magnetization process history and temperature.

One approach for solving the above-described problems associated with the requirement for use of soft magnetic underlayers in high areal density perpendicular magnetic recording media is to utilize super-paramagnetic underlayers, wherein the underlayer has a relatively weak magnetic anisotropy and a small grain size which is equal, or at least comparable, to that of the hard magnetic recording layer. However, suitable materials with sufficiently high permeability and stability are not readily available. Another approach for solving the above-described problem of noise associated with soft magnetic underlayers is to texture the latter in the radial direction so as to induce magnetorestriction anisotropy for aligning the easy axis of magnetization to the cross-track direction and then establish the preferred orientation in the soft magnetic underlayer in the cross-track direction. As a consequence of such texturing, it may be possible to achieve uniform writing conditions, thereby reducing media noise. However, there are two problems associated with this approach: first, it is difficult to establish a preferred orientation in a relatively thick soft magnetic underlayer (thickness>550 nm) by means of texturing, and second, it is likely that the permeability of such textured media will still not be sufficient, as for example, illustrated in FIG. 4(B), because of the difficulty in "flipping" the magnetic moment from the easy axis of magnetization to the hard axis of magnetization.

In view of the above, there exists a clear need for improved, high areal recording density, perpendicular magnetic information/data recording, storage, and retrieval media including magnetically soft underlayers, but which exhibit substantially increased signal-to-media noise ratios (SNMR). In addition, there exists a need for an improved method for manufacturing high areal recording density, perpendicular magnetic recording media employing magnetically soft underlayers which exhibit substantially increased SNMRs, which media can be readily and economically fabricated by means of conventional manufacturing techniques and instrumentalities.

The present invention addresses and solves problems attendant upon the use of magnetically soft underlayers in the manufacture of high bit density perpendicular magnetic media, e.g., noise generation which adversely affects the SNMR of the media, while maintaining all structural and mechanical aspects of high bit density recording technology. Moreover, the magnetic media of the present invention can be fabricated by means of conventional manufacturing techniques, e.g., sputtering.

DISCLOSURE OF THE INVENTION

An advantage of the present invention is an improved, high areal recording density, perpendicular magnetic recording medium.

Another advantage of the present invention is an improved, high areal recording density, perpendicular magnetic recording medium having an increased signal-to-noise ratio (SNR).

Still another advantage of the present invention is a method of manufacturing an improved, high areal recording density, perpendicular magnetic recording medium.

Yet another advantage of the present invention is a method of manufacturing an improved, high areal recording density, perpendicular magnetic recording medium having an increased SNR.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a low noise, high areal recording density, perpendicular magnetic recording medium, comprising:

(a) a non-magnetic substrate having a surface with a layer stack formed thereon, the layer stack comprising, in overlying sequence from the substrate surface:

(b) a soft magnetic underlayer comprised of a soft magnetic multilayer superlattice structure; and (c) a perpendicularly anisotropic, hard magnetic recording layer.

In accordance with embodiments of the present invention, the soft magnetic underlayer (b) comprises a soft magnetic multilayer superlattice structure in the form of n stacked soft magnetic/non-magnetic layer pairs, where n is an integer between about 2 and about 9.

According to particular embodiments of the present invention, each soft magnetic layer of the soft magnetic multilayer superlattice structure is from about 30 to about 150 Å thick and comprises at least one soft ferromagnetic material having a high initial permeability, selected from the group consisting of: Ni, NiFe, Co, CoNiFe, CoFe, CoZr, CoZrCr, CoZrNb, Fe, FeN, FeTaC, FeCoB, FeSiAl, FeSiAlN, and FeAlN; and each non-magnetic layer in the soft magnetic multilayer superlattice structure is from about 3 to about 10 Å thick and enables ferromagnetic or anti-ferromagnetic coupling between adjacent pairs of soft magnetic layers of the soft magnetic multilayer superlattice structure, and comprises at least one material selected from Ru, Ru—Cr alloys, other Ru-based alloys, Pd, and Pt.

In accordance with further embodiments of the present invention, at least the lowermost layer of non-magnetic material of the soft magnetic multilayer superlattice structure is provided with a desired surface texture which is replicated in each of the overlying layers of soft magnetic material of the soft magnetic multilayer superlattice structure.

According to embodiments of the present invention, the perpendicularly anisotropic, hard magnetic recording layer (c) comprises an about 200 to about 400 Å thick layer of a ferromagnetic material selected from the group consisting of: Co alloyed with one or more elements selected from Cr, Fe, Ta, Ni, Mo, Pt, V, Nb, Ge, and B, and an iron oxide selected from $Fe_3O_4$ and $\delta\text{-}Fe_2O_3$, or a (CoX/Pd or Pt), multilayer magnetic superlattice structure, where n is an integer from about 10 to about 25, each of the alternating layers of Co-based magnetic alloy is from about 2 to about 10 Å thick, X is an element selected from the group consisting of Cr, Ta, B, Mo, Cu, Ag, and Pt, and each of the alternating layers of non-magnetic Pd or Pt is from about 3 to about 15 Å thick.

In accordance with various embodiments of the present invention, the non-magnetic substrate (a) comprises a material selected from the group consisting of: Al, Ni—P-plated Al, Al—Mg alloys, other Al-based alloys, other non-magnetic metals, other non-magnetic alloys, glass, ceramics, polymers, glass-ceramics, and composites and/or laminates thereof; and the medium further comprises:

(d) a protective overcoat layer on the hard magnetic recording layer (c); and (e) a lubricant topcoat layer over the protective overcoat layer.

Another aspect of the present invention is a method of manufacturing a low noise, high areal recording density, perpendicular magnetic recording medium, comprising the sequential steps of:

(a) providing a non-magnetic substrate having a surface;

(b) forming over the surface a soft magnetic underlayer comprised of a soft magnetic multilayer superlattice structure; and (c) forming a perpendicularly anisotropic, hard magnetic recording layer over the soft magnetic multilayer superlattice structure.

According to embodiments of the present invention, step (b) comprises forming a soft magnetic multilayer superlattice structure in the form of n stacked soft magnetic/non-magnetic layer pairs, where n is an integer between about 2 and about 9.

In accordance with particular embodiments of the present invention, each soft magnetic layer in the soft magnetic multilayer superlattice structure formed in step (b) is from about 30 to about 150 Å thick and comprises at least one soft ferromagnetic material having a high initial permeability, selected from the group consisting of: Ni, NiFe, Co, CoNiFe, CoFe, CoZr, CoZrCr, CoZrNb, Fe, FeN, FeTaC, FeCoB, FeSiAl, FeSiAlN, and FeAlN; and each non-magnetic layer in the soft magnetic multilayer superlattice structure enables ferromagnetic or anti-ferromagnetic coupling between adjacent pairs of soft magnetic layers, is from about 3 to about 10 Å thick, and comprises at least one material selected from the group consisting of Ru, a Ru—Cr alloy, other Ru-based alloys, Pd, and Pt.

According to further embodiments of the present invention, step (b) further comprises providing at least the lowermost layer of non-magnetic material of the soft magnetic multilayer superlattice structure with a desired surface texture which is replicated in each of the overlying layers of soft magnetic material of the soft magnetic multilayer superlattice structure.

In accordance with still further embodiments of the present invention, step (c) comprises forming an about 200 to about 450 Å thick layer of a ferromagnetic material selected from the group consisting of: Co alloyed with one or more elements selected from Cr, Fe, Ta, Ni, Mo, Pt, V, Nb, Ge, and B, and an iron oxide selected from $Fe_3O_4$ and $\delta\text{-}Fe_2O_3$, or a $(CoX/Pd \text{ or } Pt)_n$ multilayer magnetic superlattice structure, where n is an integer from about 10 to about 25, each of the alternating layers of Co-based magnetic alloy is from about 2 to about 10 Å thick, X is an element selected from the group consisting of Cr, Ta, B, Mo, and Pt, and each of the alternating layers of non-magnetic Pd or Pt is from about 5 to about 15 Å thick.

According to embodiments of the present invention, step (a) comprises providing a non-magnetic substrate material selected from the group consisting of: Al, Ni—P-plated Al, Al—Mg alloys, other Al-based alloys, other non-magnetic metals, other non-magnetic alloys, glass, ceramics, polymers, glass-ceramics, and composites and/or laminates thereof; and the method comprises the further steps of:

(d) forming a protective overcoat layer over the hard magnetic recording layer; and (e) forming a lubricant topcoat layer over the protective overcoat layer.

In accordance with embodiments of the present invention, each of steps (b), (c), and (d) comprises performing at least one physical vapor deposition method selected from sputtering, vacuum evaporation, ion plating, ion beam deposition, and plasma deposition or at least one chemical vapor deposition method selected from CVD, MOCVD, and PECVD; and step (e) comprises performing at least one method selected from dipping, spraying, and vapor deposition.

Still another aspect of the present invention is a low noise, high areal recording density, perpendicular magnetic recording medium, comprising:

a perpendicularly anisotropic, hard magnetic recording layer; and means for increasing the signal-to-noise ratio (SNR) of the medium.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein:

FIGS. 4(A)–4(C) illustrate local M-H hysteresis loops for three extreme magnetization configurations;

FIG. 5 schematically illustrates, in simplified perspective view, a portion of a perpendicular recording medium including a basic soft magnetic multilayer superlattice structure according to the present invention;

DESCRIPTION OF THE INVENTION

The present invention addresses and solves problems arising from the generation of noise in perpendicular magnetic recording media employing magnetically soft underlayers, e.g., of NiFe (Permalloy). Specifically, the present invention is based upon the recognition that noise in such perpendicular media may be attributed, in significant part, to the presence of inhomogeneous magnetic configurations, such as Bloch domains, other types of domain walls, and vortex structures, as well as to poor media writing arising from the presence of nonuniform magnetization distributions in the soft magnetic underlayers. A key feature, therefore, of the present invention is the formation of novel soft magnetic underlayers based upon multilayer superlattice structures which eliminate the above-described sources of noise associated with the conventional soft magnetic underlayers.

Figure 1:
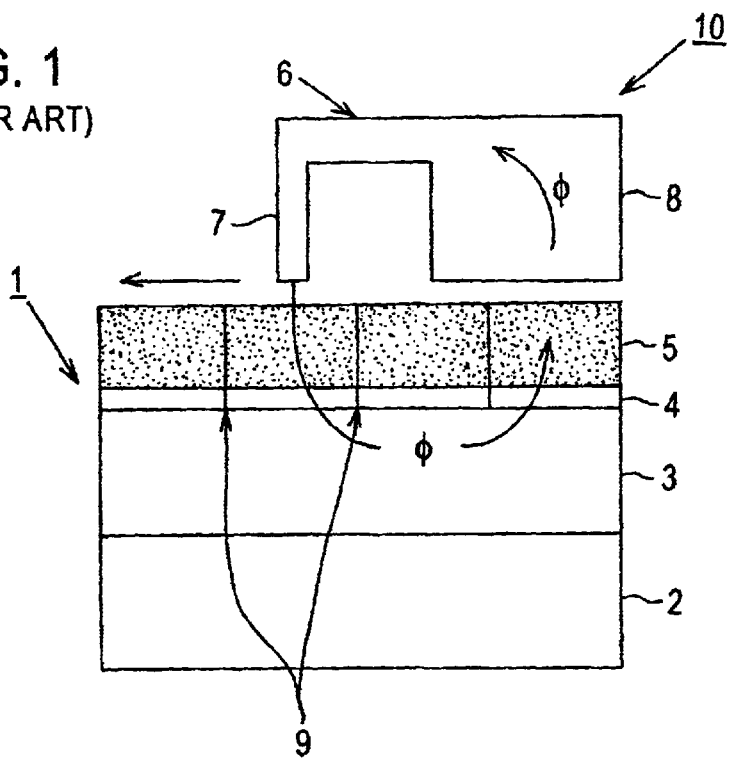
FIG. 1 schematically illustrates, in simplified, cross-sectional view, a portion of a magnetic recording, storage, and retrieval system comprised of a conventional perpendicular-type magnetic recording medium including a soft magnetic underlayer and a single-pole transducer head.
Figure 2:
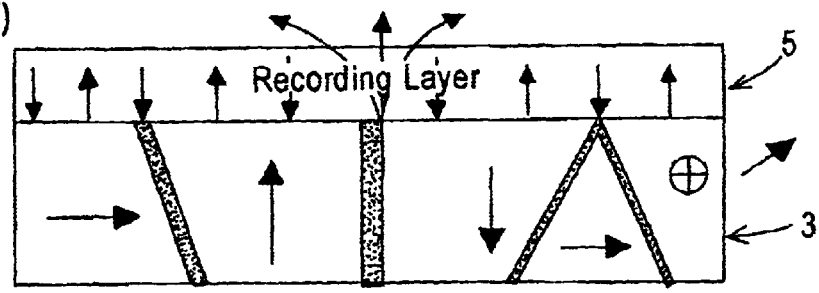
FIG. 2 schematically illustrates, in simplified perspective view, noise fields in perpendicular recording media arising from inhomogeneous magnetization of the soft magnetic underlayer.
Figure 3:
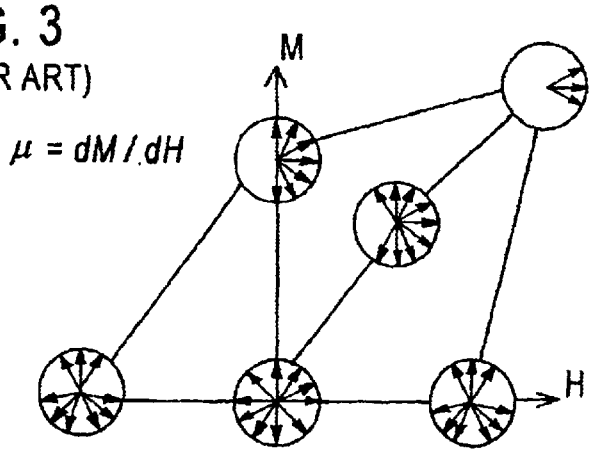
FIG. 3 schematically illustrates magnetic moment distributions for various magnetization states in bulk soft magnetic material.

Referring now to FIG. 5, schematically illustrated therein, in simplified perspective view, is a portion of a perpendicular magnetic recording medium 20 fabricated according to the principles of the invention. More specifically, perpendicular magnetic recording medium 20 resembles the conventional perpendicular magnetic recording medium of FIG. 1 and comprises a series of layers arranged in an overlying sequence on a suitable non-magnetic substrate 2, i.e., including (1) a soft magnetic underlayer 3' of multilayer superlattice structure according to the present invention (described in detail below); (2) an optional non-magnetic interlayer 4 less than about 20–30 Å thick (not shown in the figure for illustrative simplicity); and (3) a perpendicularly oriented, hard magnetic recording layer 5.

In accordance with embodiments of the present invention, the non-magnetic substrate 2 is sufficiently thick as to provide a desired rigidity and comprises a material selected from the group consisting of: Al, Ni—P-plated Al, Al—Mg alloys, other Al-based alloys, other non-magnetic metals, other non-magnetic alloys, glass, ceramics, polymers, glass-ceramics, and composites and/or laminates thereof.

Overlying the substrate 2 is a soft magnetic multilayer superlattice underlayer structure 3' according to the invention, in the form of n stacked soft magnetic/non-magnetic layer pairs, $(3_A/3^B)_n$, where n is an integer between about 2 and about 8, and wherein each soft magnetic layer $3_A$ of the soft magnetic multilayer superlattice structure 3' is from about 30 to about 150 Å thick and comprises at least one soft ferromagnetic material having a high initial permeability; selected from the group consisting of: Ni, NiFe, Co, CoNiFe, CoFe, CoZr, CoZrCr, CoZrNb, Fe, FeN, FeTaC, FeCoB, FeSiAl, FeSiAlN, and FeAlN; and each non-magnetic layer $3_B$ of the soft magnetic superlattice structure 3' facilitates ferromagnetic or anti-ferromagnetic coupling between adjacent pairs of soft magnetic layers $3_A$, is from about 3 to about 10 Å thick, and comprises at least one material selected from the group consisting of Ru, Ru—Cr alloys, other Ru-based alloys, Pd, and Pt.

As indicated above, a non-magnetic, thin interlayer 4 less than about 20–30 Å thick, comprised of a non-magnetic material such as TiCr is optionally interposed between the uppermost layer $(3_A)_n$ of soft ferromagnetic material and the lower surface of the hard magnetic recording layer 5 for preventing magnetic interaction between the soft magnetic multilayer superlattice underlayer 3' and the perpendicularly anisotropic, hard magnetic recording layer 5 and for promoting formation of desired microstructural and magnetic properties of the hard recording layer 5. In addition, at least the lowermost layer of non-magnetic material $(3_B)_1$ of the soft magnetic multilayer superlattice structure 3' may be provided with a desired surface texture which is replicated in each of the overlying layers $(3_A)_n$ of soft magnetic material of the soft magnetic multilayer superlattice structure 3'.

According to embodiments of the present invention, the perpendicularly anisotropic, hard magnetic recording layer 5 comprises an about 200 to about 400 Å thick layer of a ferromagnetic material selected from the group consisting of: Co alloyed with one or more elements selected from Cr, Fe, Ta, Ni, Mo, Pt, V, Nb, Ge, and B, and an iron oxide selected from $Fe_3O_4$ and $\delta\text{-}Fe_2O_3$, or a $(CoX/Pd$ or $Pt)_n$ multilayer magnetic superlattice structure, where n is an integer from about 10 to about 25, each of the alternating layers of Co-based magnetic alloy is from about 2 to about 10 Å thick, X is an element selected from the group consisting of Cr, Ta, B, Mo, Cu, Ag, and Pt, and each of the alternating layers of non-magnetic Pd or Pt is from about 3 to about 15 Å thick. Each type of hard magnetic recording layer 5 material has perpendicular anisotropy arising from magneto-crystalline anisotropy ($1^{st}$ type) and/or interfacial anisotropy ($2^{nd}$ type).

Medium 20 typically further comprises a protective overcoat layer on the uppermost surface of the hard magnetic recording layer and a lubricant topcoat layer over the protective overcoat layer (both of which are not shown in the figure in order not to unnecessarily obscure the present invention).

Each of layers 3–5 and the protective overcoat layer may be formed utilizing at least one physical vapor deposition method selected from sputtering, vacuum evaporation, ion plating, ion beam deposition, and plasma deposition or at least one chemical vapor deposition method selected from CVD, MOCVD, and PECVD; and the lubricant topcoat layer may be formed utilizing at least one method selected from dipping, spraying, and vapor deposition.

Thus, according to the invention, the soft magnetic underlayer 3 of the conventional perpendicular magnetic recording medium (such as medium 1 of FIG. 1) is replaced with a multilayer superlattice structure 3' wherein soft magnetic layers $3_A$ are separated by non-magnetic spacer layers $3_B$. The thickness of each soft magnetic layer $3_A$ should be less than about 150 Å if NiFe (Permalloy) is utilized as the material of the soft magnetic layers $3_A$. The thickness of each non-magnetic spacer layer $3_B$ should be about 6–8 Å, depending upon the type of coupling facilitated by the spacer layer material. As indicated above, the material of the soft magnetic layers $3_A$ should be ferromagnetic, with high initial permeability (e.g., >10,000), whereas the material of the non-magnetic spacer layers $3_B$ should be either paramagnetic or superparamagnetic, with high permeability. In particular, certain types of spacer layer materials, such as Ru and Ru-based alloys, can create novel properties via interlayer coupling mechanisms. Finally, pairs of adjacent soft magnetic layers $3_A$ can be either ferromagnetically coupled ("FC") or anti-ferromagnetically coupled ("AFC").

Magnetically soft multilayer superlattice structures 3' according to the present invention can provide a number of advantageous features, properties, and characteristics not attainable with conventional soft magnetic underlayers 3 utilized in perpendicular magnetic recording media. Specifically, the magnetically soft multilayer superlattice structures 3' can substantially completely eliminate the stray or fringe fields from vertically oriented domain structures and vertical domain walls. As is well known, if the thickness of each soft magnetic layer $3_A$ is less than a certain value, e.g., <150 Å for NiFe (Permalloy), the magnetization must be inclined in the plane of the layer due to magnetostatic interaction. If no vertical domains and/or domain walls are present in the magnetically soft underlayer 3', then, as a consequence, no magnetic flux which can adversely affect the read transducer will emanate therefrom. In addition, magnetically soft multilayer superlattice structures 3' according to the invention can enhance initial permeability in the plane of the magnetically soft layers $3_A$, and if certain materials, notably Ru or Ru-based alloys, are utilized for the non-magnetic spacer layers $3_B$, as in the portion of a disk-shaped medium 30 shown in FIG. 6, the local permeability may be made uniform due to the anti-ferromagnetic coupling (AFC) induced by the Ru or Ru-based spacer layers. Moreover, the magnetic charges within the soft magnetic underlayers $3_A$ will be internally cancelled out. Finally, establishment of a desired or preferred orientation of the thin soft magnetic layers $3_A$ is readily possible by utilizing an appropriately textured lowermost non-magnetic spacer layer $3_{B1}$, such that the texture of the latter is transferred (i.e., replicated) from the lowermost soft magnetic layer $3_{A1}$ to the uppermost soft magnetic layer $(3_A)_n$, layer-by-layer.

Figure 6:
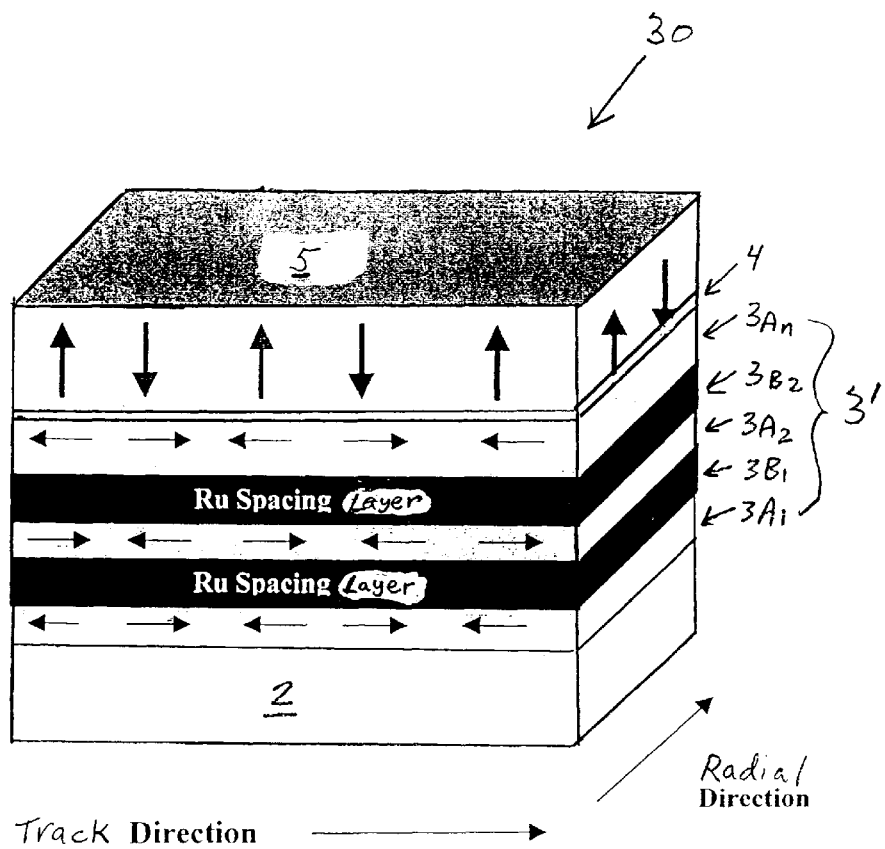
FIG. 6 schematically illustrates, in simplified perspective view, a portion of a disk-shaped, perpendicular recording medium including a soft magnetic multilayer superlattice structure comprising soft magnetic layers which are anti-ferromagnetically coupled together by means of intervening Ru-based spacer layers.
Figure 7:
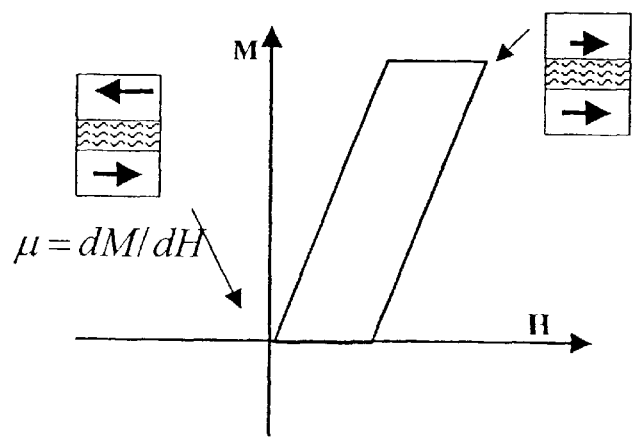
FIG. 7 schematically illustrates a local M-H hysteresis loop for the anti-ferromagnetically coupled soft underlayer of the medium of FIG. 6.

Adverting to FIG. 7, shown therein is the local M-H hysteresis loop for a soft magnetic underlayer 3' according to the present invention, comprised of a multilayer superlattice structure as shown in FIG. 6, wherein a plurality of pairs of adjacent soft magnetic layers $3_A$, e.g., of NiFe (Permalloy) are anti-ferromagnetically coupled by means of Ru spacer layers $3_B$. Because of the anti-ferromagnetic coupling between the adjacent soft magnetic layers $3_A$, the magnetic reversal process in each of the soft magnetic layers $3_A$ is substantially completely reversible, thereby satisfying the requirements for obtaining a consistent, uniform, and clean writing process. In addition, the initial permeability is uniform and very high (e.g., >10,000), thereby providing sharp written transitions (it being noted that in the writing process, the sharpness of the written transition is determined by the head field gradient).

Figure 8:
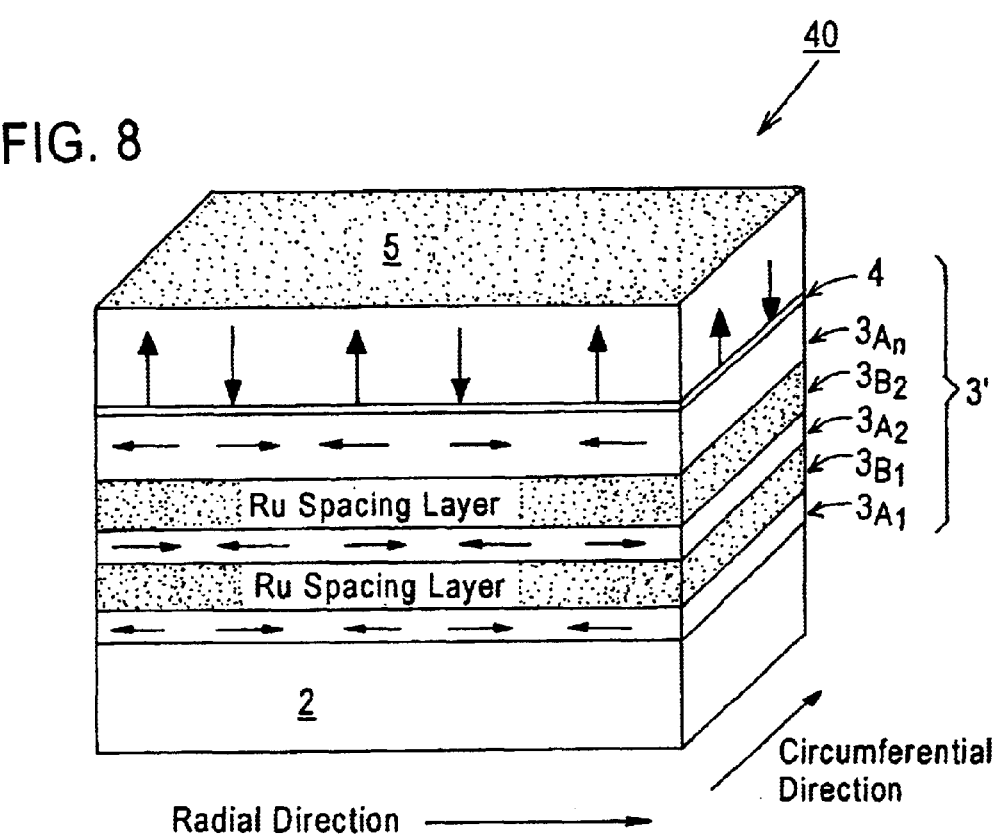
FIG. 8 schematically illustrates, in simplified perspective view, a portion of a disk-shaped, perpendicular recording medium including a preferentially radially oriented anti-ferromagnetically coupled underlayer comprised of a soft magnetic multilayer superlattice structure.

FIG. 8 schematically illustrates a portion of a disk-shaped perpendicular magnetic recording medium 40 according to a particularly advantageous embodiment of the present invention, wherein texture is introduced in the radial direction, whereby a maximum amount of uniformity of permeability is achieved.

Figure 9:
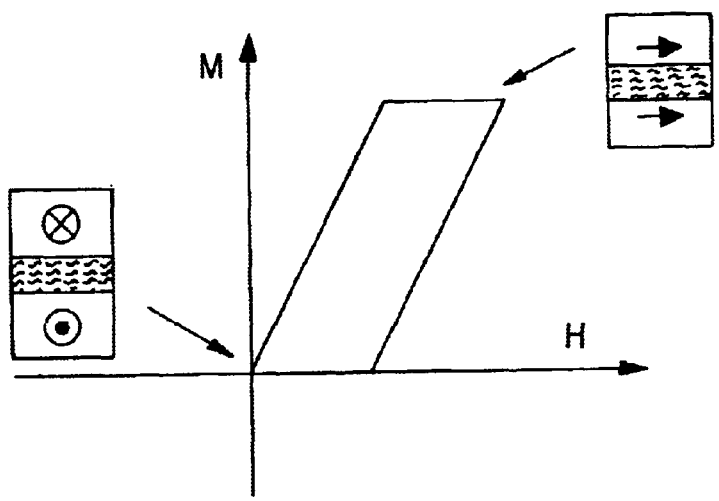
FIG. 9 schematically illustrates a local M-H hysteresis loop for the preferentially radially oriented anti-ferromagnetically coupled soft underlayer of the medium of FIG. 8.

FIG. 9 illustrates the local M-H hysteresis loop of the soft magnetic underlayer 3' of this embodiment.

Thus, the present invention advantageously provides improved, high areal recording density, perpendicular magnetic data/information recording, storage, and retrieval media including a novel multilayer superlattice-based, magnetically soft underlayer, in which (1) domain wall formation and/or motion is substantially eliminated; (2) stray or fringe fields from vertically oriented domains and domain walls are eliminated; (3) in-plane initial permeability is enhanced; and (4) local permeability is made uniform due to AFC coupling between thin, soft magnetic layers. As a consequence, the inventive methodology effectively eliminates, or at least suppresses, the generation of noise associated with high bit density, perpendicular magnetic media utilizing conventional magnetically soft underlayers. The media of the present invention are especially useful when employed in conjunction with single-pole recording/retrieval transducer heads and enjoy particular utility in high recording density media for computer-related applications. In addition, the inventive media can be readily fabricated by means of conventional methodologies, e.g., sputtering techniques.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A perpendicular magnetic recording medium, comprising:
   (a) a non-magnetic substrate having a surface with a layer stack formed thereon, said layer stack comprising, in overlying sequence from said substrate surface:
   (b) a soft magnetic underlayer comprised of a soft magnetic multilayer superlattice structure comprising stacked magnetic/non-magnetic pairs, wherein at least the lowermost non-magnetic layer is provided with a desired surface texture; and
   (c) a perpendicularly anisotropic, hard magnetic recording layer.

2. The magnetic recording medium as in claim 1, wherein: said soft magnetic underlayer (b) comprises a soft magnetic multilayer superlattice structure in the form of n stacked soft magnetic/non-magnetic layer pairs, where n is an integer between 2 and about 9.

3. The magnetic recording medium as in claim 2, wherein: each soft magnetic layer of said soft magnetic multilayer superlattice structure comprises at least one soft ferromagnetic material having a high initial permeability, selected from the group consisting of: Ni, NiFe, Co, CoNiFe, CoFe, CoZr, CoZrCr, CoZrNb, Fe, FeN, FeTaC, FeCoB, FeSiAl, FeSiAlN, and FeAlN.

4. The magnetic recording medium as in claim 3, wherein: each soft magnetic layer is from about 30 to about 150 Å thick.

5. The magnetic recording medium as in claim 3, wherein: each soft magnetic layer in said soft magnetic multilayer superlattice structure comprises NiFe.

6. The magnetic recording medium as in claim 2, wherein: each non-magnetic layer in said soft magnetic superlattice structure comprises at least one material selected from the group consisting of Ru, Ru—Cr alloys, other Ru-based alloys, Pd, and Pt.

7. The magnetic recording medium as in claim 6, wherein: each non-magnetic layer is from about 3 to about 10 Å thick and facilitates ferromagnetic or anti-ferromagnetic coupling between adjacent pairs of said soft magnetic layers of said soft magnetic multilayer superlattice structure.

8. The magnetic recording medium as in claim 2, wherein: at least the lowermost non-magnetic layer of said soft magnetic multilayer superlattice structure is provided with a desired surface texture which is replicated in each of the overlying soft magnetic layers of said soft magnetic multilayer superlattice structure.

9. The magnetic recording medium as in claim 1, wherein: said perpendicularly anisotropic, hard magnetic recording layer (c) comprises an about 200 to about 400 Å thick layer of a ferromagnetic material selected from the group consisting of: Co alloyed with one or more elements selected from Cr, Fe, Ta, Ni, Mo, Pt, V, Nb, Ge, and B, and an iron oxide selected from $Fe_3O_4$ and $\delta\text{-}Fe_2O_3$, or a $(CoX/Pd \text{ or } Pt)_n$ multilayer magnetic superlattice structure, where n is an integer from about 10 to about 25, each of the alternating layers of Co-based magnetic alloy is from about 2 to about 10 Å thick, X is an element selected from the group consisting of Cr, Ta, B, Mo, Cu, Ag, and Pt, and each of the alternating layers of non-magnetic Pd or Pt is from about 3 to about 15 Å thick.

10. The magnetic recording medium as in claim 1, wherein:
    said non-magnetic substrate (a) comprises a material selected from the group consisting of: Al, NiP-plated Al, Al—Mg alloys, other Al-based alloys, other non-magnetic metals, other non-magnetic alloys, glass, ceramics, polymers, glass-ceramics, and composites and/or laminates thereof.

11. The magnetic recording medium as in claim 1, further comprising:
    (d) a protective overcoat layer on said hard magnetic recording layer (c); and
    (e) a lubricant topcoat layer over said protective overcoat layer.

12. A method of manufacturing a perpendicular magnetic recording medium, comprising the sequential steps of:
    (a) providing a non-magnetic substrate having a surface;
    (b) forming over said surface a soft magnetic underlayer comprised of a soft magnetic multilayer superlattice structure comprising stacked magnetic/non-magnetic pairs, wherein at least the lowermost non-magnetic layer is provided with a desired surface texture; and
    (c) forming a perpendicularly anisotropic, hard magnetic recording layer over said soft magnetic multilayer superlattice structure.

13. The method according to claim 12, wherein:
    step (b) comprises forming a soft magnetic multilayer superlattice structure in the form of n stacked soft magnetic/non-magnetic layer pairs, where n is an integer between 2 and about 9.

14. The method according to claim 13, wherein:

each soft magnetic layer in said soft magnetic multilayer superlattice structure formed in step (b) is from about 30 to about 150 Å thick and comprises at least one soft ferromagnetic material having a high initial permeability, selected from the group consisting of: Ni, NiFe, Co, CoNiFe, CoFe, CoZr, CoZrCr, CoZrNb, Fe, FeN, FeTaC, FeCoB, FeSiAl, FeSiAlN, and FeAlN.

15. The method according to claim 13, wherein:

each non-magnetic layer in said soft magnetic multilayer superlattice structure formed in step (b) facilitates ferromagnetic or anti-ferromagnetic coupling between adjacent pairs of soft magnetic layers, is from about 3 to about 10 Å thick, and comprises at least one material selected from the group consisting of Ru, Ru—Cr alloys, other Ru-based alloys, Pd, and Pt.

16. The method according to claim 15, wherein:

step (b) further comprises providing at least the lowermost layer of non-magnetic material of said soft magnetic multilayer superlattice structure with a desired surface texture which is replicated in each of the overlying layers of soft magnetic material of said soft magnetic multilayer superlattice structure.

17. The method according to claim 12, wherein:

step (c) comprises forming an about 200 to about 400 Å thick layer of a ferromagnetic material selected from the group consisting of: Co alloyed with one or more elements selected from Cr, Fe, Ta, Ni, Mo, Pt, V, Nb, Ge, and B, and an iron oxide selected from $Fe_3O_4$ and $\delta\text{-}Fe_2O_3$, or a $(CoX/Pd \text{ or } Pt)_n$ multilayer magnetic superlattice structure, where n is an integer from about 10 to about 25, each of the alternating layers of Co-based magnetic alloy is from about 2 to about 10 Å thick, X is an element selected from the group consisting of Cr, Ta, B, Mo, Cu, Ag, and Pt, and each of the alternating layers of non-magnetic Pd or Pt is from about 3 to about 15 Å thick.

18. The method according to claim 12, wherein:

step (a) comprises providing a non-magnetic substrate material selected from the group consisting of: Al, NiP-plated Al, Al—Mg alloys, other Al-based alloys, other non-magnetic metals, other non-magnetic alloys, glass, ceramics, polymers, glass-ceramics, and composites and/or laminates thereof; and the method comprises the further steps of:

(d) forming a protective overcoat layer over said hard magnetic recording layer; and (e) forming a lubricant topcoat layer over said protective overcoat layer.

19. The method according to claim 18, wherein:

each of steps (b), (c), and (d) comprises performing at least one physical vapor deposition method selected from sputtering, vacuum evaporation, ion plating, ion beam deposition, and plasma deposition or at least one chemical vapor deposition method selected from CVD, MOCVD, and PECVD; and step (e) comprises performing at least one method selected from dipping, spraying and vapor deposition.

* * * * *